United States Patent [19]

Bottero et al.

[11] Patent Number: 5,451,328
[45] Date of Patent: Sep. 19, 1995

[54] COAGULATION/FLOCCULATION TECHNIQUE

[75] Inventors: Jean-Yves Bottero; Bruno Lartiges, both of Nancy; Herv3 Suty, Champigny Sur Marne, all of France

[73] Assignee: Elf Atochem S.A., Puteaux, France

[21] Appl. No.: 85,042

[22] Filed: Jul. 2, 1993

[30] Foreign Application Priority Data

Jul. 2, 1992 [FR] France .................. 92 08151

[51] Int. Cl.⁶ ............................................. C02F 1/52
[52] U.S. Cl. ...................................... 210/724; 210/738
[58] Field of Search ............. 210/702, 726, 727, 724, 210/725, 738, 199, 208, 219, 709

[56] References Cited

U.S. PATENT DOCUMENTS

| | | | |
|---|---|---|---|
| 3,377,274 | 4/1968 | Burke et al. | 210/738 |
| 3,660,284 | 5/1972 | Camp | 210/738 |
| 3,936,229 | 2/1976 | Glover | 259/108 |
| 4,179,368 | 12/1979 | Willis | 210/709 |
| 4,290,898 | 9/1981 | von Hagel et al. | 210/738 |
| 4,295,973 | 10/1981 | Jain | 210/738 |
| 4,347,141 | 8/1982 | Rothberg | 210/726 |
| 4,388,195 | 6/1983 | von Hagel et al. | 210/738 |
| 5,269,940 | 12/1993 | Kawamura et al. | 210/738 |

FOREIGN PATENT DOCUMENTS 2304572  10/1976  France .
2631021  10/1989  France .

OTHER PUBLICATIONS

Database WPIL, Section Ch, Week 9131, Derwent Publications Ltd., London, GB; Class A97, AN 91225264 & HU-A-55 705 (Dunantuli Regionali) 28 Jun. 1991.
Patent Abstracts of Japan, vol. 13, No. 105 (C-575)13 Mar. 1989 & JP-A-63 278 509 (Ebara Infilco Co Ltd) 16 Nov. 1988.

*Primary Examiner*—Peter A. Hruskoci
*Attorney, Agent, or Firm*—Burns, Doane, Swecker & Mathis

[57] ABSTRACT

Aggregate-forming suspensions containing a coagulant therefor, e.g., $FeCl_3$, polyaluminum chloride or $Al_2(SO_4)_3$, are coagulated/flocculated by stirring to provide mechanically strong flocs of greater average diameter size, without concomitant formation of irreversible microflocs, and wherein the stirring regime, in at least the initial stage of coagulation/flocculation, includes an initial operating stirring cycle comprising (i) a rapid stirring sequence at an average velocity gradient ranging from 300 to 1,000 $s^{-1}$ for a period of time ranging from 30 to 200 seconds, and (ii) a slow stirring sequence at an average velocity gradient ranging from 40 to 100 $s^{-1}$ for a period of time ranging from 5 to 40 minutes.

15 Claims, 13 Drawing Sheets $FeCl_3$ -pH 5,5 - 250;60/350;60/450;60
TEST PROCEDURE II (INVENTION)

FeCl₃ -pH 5,5 - 60;60/120;60/250;60
TEST PROCEDURE I (CONTROL)

FeCl₃ -pH 5,5 - 250;60/350;60/450;60
TEST PROCEDURE II (INVENTION)

FeCl₃ -pH 7,0 - 60;60/120;60/250;60
TEST PROCEDURE I (CONTROL)

FeCl₃ -pH 7,0 -250;60/350;60/450;60
TEST PROCEDURE II (INVENTION)

Wac HP-pH 8,0-60;60/120;60/250;60
TEST PROCEDURE I (CONTROL)

Wac HB-pH 8,0-250;60/350;60/450;60
TEST PROCEDURE II (INVENTION)

ALUMINUM SULFATE pH 8,0-60;60/120;60/250;60
TEST PROCEDURE I (CONTROL)

ALUMINUM SULFATE -pH 8,0-250;60/350;60/450;60
TEST PROCEDURE II (INVENTION)

DATA AS DEPICTED IN FIG.2a

| t | P50 | Vc |
|---|---|---|
| 0,000 | 17,150 | 0,002 |
| 17,000 | 49,120 | 0,030 |
| 36,000 | 67,160 | 0,068 |
| 53,000 | 74,570 | 0,087 |
| 72,000 | 75,690 | 0,101 |
| 91,000 | 76,620 | 0,108 |
| 108,000 | 75,900 | 0,111 |
| 125,000 | 75,470 | 0,110 |
| 142,000 | 74,300 | 0,112 |
| 161,000 | 72,810 | 0,112 |
| 180,000 | 71,670 | 0,112 |
| 197,000 | 70,970 | 0,115 |
| 216,000 | 69,590 | 0,119 |
| 241,000 | 63,620 | 0,111 |
| 366,000 | 59,200 | 0,104 |
| 490,000 | 56,110 | 0,101 |
| 612,000 | 54,100 | 0,103 |
| 736,000 | 52,510 | 0,097 |
| 859,000 | 50,870 | 0,094 |
| 902,000 | 49,830 | 0,098 |
| 1107,000 | 48,760 | 0,092 |
| 1229,000 | 47,920 | 0,091 |
| 1353,000 | 47,030 | 0,089 |
| 1477,000 | 46,200 | 0,087 |
| 1602,000 | 45,570 | 0,088 |
| 1728,000 | 44,490 | 0,087 |
| 1979,000 | 43,290 | 0,085 |
| 1997,000 | 40,540 | 0,067 |
| 2016,000 | 37,820 | 0,058 |
| 2034,000 | 35,090 | 0,049 |
| 2053,000 | 32,520 | 0,042 |
| 2073,000 | 30,560 | 0,037 |
| 2090,000 | 28,920 | 0,034 |
| 2108,000 | 27,480 | 0,032 |
| 2125,000 | 26,190 | 0,029 |
| 2144,000 | 25,120 | 0,029 |
| 2164,000 | 25,390 | 0,028 |
| 2181,000 | 26,150 | 0,029 |
| 2200,000 | 26,570 | 0,029 |
| 2221,000 | | |

DATA AS DEPICTED IN FIG.2b

| t | P50 | Vc |
|---|---|---|
| 0,000 | | 0,020 |
| 7,000 | 93,960 | 0,777 |
| 33,000 | 290,730 | 0,730 |
| 48,000 | 278,710 | 0,663 |
| 70,000 | 251,270 | 0,657 |
| 92,000 | 248,860 | 0,598 |
| 114,000 | 226,090 | 0,582 |
| 135,000 | 221,660 | 0,547 |
| 157,000 | 206,020 | 0,641 |
| 178,000 | 228,650 | 0,644 |
| 200,000 | 230,540 | 0,641 |
| 221,000 | 226,480 | 0,603 |
| 251,000 | 194,860 | 0,564 |
| 378,000 | 182,600 | 0,567 |
| 505,000 | 176,080 | 0,534 |
| 632,000 | 169,750 | 0,530 |
| 759,000 | 166,480 | 0,529 |
| 886,000 | 160,740 | 0,512 |
| 1012,000 | 159,020 | 0,510 |
| 1139,000 | 156,730 | 0,509 |
| 1266,000 | 155,060 | 0,496 |
| 1393,000 | 151,720 | 0,498 |
| 1520,000 | 150,250 | 0,486 |
| 1646,000 | 147,420 | 0,483 |
| 1774,000 | 147,350 | 0,464 |
| 1962,000 | 144,880 | 0,389 |
| 1984,000 | 153,160 | 0,376 |
| 2006,000 | 152,790 | 0,369 |
| 2022,000 | 151,270 | 0,362 |
| 2038,000 | 148,480 | 0,358 |
| 2055,000 | 147,240 | 0,358 |
| 2071,000 | 146,430 | 0,348 |
| 2087,000 | 143,670 | 0,342 |
| 2103,000 | 143,010 | 0,339 |
| 2119,000 | 141,960 | 0,335 |
| 2136,000 | 140,910 | 0,440 |
| 2162,000 | 152,780 | 0,504 |
| 2183,000 | 156,630 | 0,499 |
| 2310,000 | 153,840 | |
| 2437,000 | | |

FIG.6a

DATA AS DEPICTED IN FIG.2a

| t | P50 | Vc |
|---|---|---|
| 2345,000 | 27,700 | 0,031 |
| 2469,000 | 28,070 | 0,032 |
| 2592,000 | 28,190 | 0,035 |
| 2716,000 | 28,120 | 0,033 |
| 2838,000 | 28,070 | 0,035 |
| 2963,000 | 27,990 | 0,033 |
| 3087,000 | 27,830 | 0,033 |
| 3209,000 | 27,760 | 0,035 |
| 3333,000 | 27,650 | 0,033 |
| 3455,000 | 27,470 | 0,033 |
| 3680,000 | 27,450 | 0,036 |
| 3704,000 | 27,240 | 0,033 |
| 3960,000 | 26,900 | 0,035 |
| 3981,000 | 23,360 | 0,026 |
| 4000,000 | 16,560 | 0,011 |
| 4017,000 | 11,410 | 0,007 |
| 4036,000 | 8,880 | 0,005 |
| 4055,000 | 7,620 | 0,004 |
| 4072,000 | 6,990 | 0,004 |
| 4091,000 | 6,510 | 0,003 |
| 4108,000 | 6,330 | 0,003 |
| 4127,000 | 6,040 | 0,003 |
| 4148,000 | 5,850 | 0,003 |
| 4165,000 | 5,860 | 0,003 |
| 4184,000 | 5,880 | 0,003 |
| 4207,000 | 5,910 | 0,003 |
| 4331,000 | 6,060 | 0,004 |
| 4455,000 | 6,250 | 0,004 |
| 4577,000 | 6,350 | 0,004 |
| 4701,000 | 6,480 | 0,004 |
| 4823,000 | 6,670 | 0,004 |
| 4947,000 | 6,780 | 0,004 |
| 5071,000 | 7,000 | 0,004 |
| 5193,000 | 7,130 | 0,004 |
| 5317,000 | 7,070 | 0,004 |
| 5440,000 | 7,060 | 0,005 |
| 5564,000 | 7,480 | 0,004 |
| 5688,000 | 7,140 | 0,004 |

DATA AS DEPICTED IN FIG.2b

| t | P50 | Vc |
|---|---|---|
| 2564,000 | 151,120 | 0,507 |
| 2690,000 | 148,120 | 0,492 |
| 2816,000 | 146,440 | 0,489 |
| 2944,000 | 145,430 | 0,492 |
| 3069,000 | 142,160 | 0,492 |
| 3196,000 | 142,070 | 0,484 |
| 3323,000 | 140,500 | 0,476 |
| 3450,000 | 140,060 | 0,483 |
| 3576,000 | 138,600 | 0,484 |
| 3703,000 | 138,480 | 0,477 |
| 3954,000 | 136,520 | 0,476 |
| 3976,000 | 131,520 | 0,363 |
| 3992,000 | 132,440 | 0,290 |
| 4008,000 | 131,280 | 0,278 |
| 4024,000 | 128,530 | 0,268 |
| 4041,000 | 125,900 | 0,257 |
| 4057,000 | 125,970 | 0,258 |
| 4074,000 | 123,270 | 0,249 |
| 4090,000 | 120,660 | 0,244 |
| 4106,000 | 120,330 | 0,242 |
| 4123,000 | 118,780 | 0,240 |
| 4139,000 | 117,030 | 0,236 |
| 4160,000 | 136,210 | 0,385 |
| 4282,000 | 146,290 | 0,488 |
| 4409,000 | 141,780 | 0,478 |
| 4536,000 | 138,780 | 0,476 |
| 4663,000 | 139,040 | 0,480 |
| 4790,000 | 135,570 | 0,480 |
| 4916,000 | 135,500 | 0,480 |
| 5043,000 | 134,280 | 0,474 |
| 5170,000 | 133,330 | 0,471 |
| 5297,000 | 132,320 | 0,472 |
| 5424,000 | 131,930 | 0,473 |
| 5551,000 | 131,190 | 0,474 |
| 5678,000 | 130,270 | 0,474 |

FIG.6b

DATA AS DEPICTED IN FIG.3a

| t | P50 | Vc |
|---|---|---|
| 0,000 | 303,710 | 0,783 |
| 19,000 | 305,130 | 1,612 |
| 37,000 | 299,330 | 1,489 |
| 59,000 | 296,390 | 1,873 |
| 82,000 | 297,310 | 1,914 |
| 106,000 | 297,100 | 1,950 |
| 127,000 | 296,900 | 1,979 |
| 150,000 | 296,530 | 2,021 |
| 172,000 | 296,590 | 2,005 |
| 195,000 | 296,530 | 2,035 |
| 218,000 | 296,620 | 2,021 |
| 240,000 | 296,410 | 1,993 |
| 263,000 | 297,060 | 2,059 |
| 303,000 | 296,150 | 2,053 |
| 431,000 | 295,610 | 2,064 |
| 560,000 | 295,200 | 2,032 |
| 686,000 | 295,290 | |
| 815,000 | 295,220 | 2,031 |
| 941,000 | 294,480 | 2,062 |
| 1070,000 | 294,610 | 2,030 |
| 1198,000 | 294,310 | 2,033 |
| 1325,000 | 294,090 | 2,024 |
| 1453,000 | 294,420 | 1,985 |
| 1580,000 | 294,180 | 1,994 |
| 1708,000 | 294,260 | 2,010 |
| 1837,000 | 294,340 | 2,000 |
| 1979,000 | 294,110 | 1,979 |
| 2002,000 | 293,390 | 1,880 |
| 2026,000 | 292,990 | 1,847 |
| 2047,000 | 292,610 | 1,819 |
| 2070,000 | 292,450 | 1,799 |
| 2094,000 | 292,020 | 1,789 |
| 2115,000 | 291,910 | 1,768 |
| 2139,000 | 291,660 | 1,760 |
| 2160,000 | 291,580 | 1,748 |
| 2184,000 | 291,530 | 1,760 |
| 2207,000 | 291,360 | 1,776 |
| 2229,000 | 291,390 | 1,771 |
| 2250,000 | 291,480 | 1,765 |
| 2286,000 | 291,150 | |

DATA AS DEPICTED IN FIG.3b

| t | P50 | Vc |
|---|---|---|
| 0,000 | 301,590 | 1,313 |
| 19,000 | 294,650 | 1,349 |
| 42,000 | 293,800 | 1,302 |
| 63,000 | 293,630 | 1,305 |
| 86,000 | 293,740 | 1,300 |
| 110,000 | 295,090 | 1,275 |
| 131,000 | 294,790 | 1,264 |
| 154,000 | 294,670 | 1,249 |
| 175,000 | 295,680 | 1,304 |
| 199,000 | 295,530 | 1,302 |
| 222,000 | 295,200 | 1,308 |
| 243,000 | 295,170 | 1,302 |
| 266,000 | 294,840 | 1,301 |
| 294,000 | 294,850 | 1,309 |
| 422,000 | 294,240 | 1,273 |
| 551,000 | 293,960 | 1,265 |
| 677,000 | 294,080 | 1,280 |
| 806,000 | 293,310 | 1,260 |
| 932,000 | 293,080 | 1,258 |
| 1060,000 | 293,440 | 1,270 |
| 1189,000 | 292,780 | 1,250 |
| 1315,000 | 292,930 | 1,259 |
| 1443,000 | 292,700 | 1,240 |
| 1570,000 | 292,280 | 1,240 |
| 1698,000 | | |
| 1826,000 | | |
| 1992,000 | 292,100 | 1,179 |
| 2015,000 | 294,410 | 1,154 |
| 2039,000 | 294,980 | 1,147 |
| 2060,000 | 295,000 | 1,146 |
| 2083,000 | 295,320 | 1,147 |
| 2106,000 | 295,280 | 1,135 |
| 2128,000 | 295,280 | 1,128 |
| 2151,000 | 294,870 | 1,124 |
| 2172,000 | 297,460 | 1,180 |
| 2195,000 | 297,960 | 1,222 |
| 2219,000 | 297,360 | 1,227 |
| 2240,000 | 296,900 | 1,231 |
| 2263,000 | 296,760 | 1,226 |
| 2288,000 | 296,520 | 1,222 |

DATA AS DEPICTED IN FIG.3a

| t | P50 | Va |
|---|---|---|
| 2415,000 | 290,890 | 1,783 |
| 2543,000 | 290,930 | 1,773 |
| 2670,000 | 290,780 | 1,754 |
| 2799,000 | 292,150 | 1,749 |
| 2925,000 | 292,220 | 1,760 |
| 3053,000 | 292,060 | 1,759 |
| 3182,000 | 291,030 | 1,753 |
| 3308,000 | 291,930 | 1,756 |
| 3436,000 | 291,790 | 1,767 |
| 3563,000 | 291,610 | 1,767 |
| 3692,000 | 291,790 | 1,766 |
| 3821,000 | 291,650 | 1,745 |
| 3975,000 | 291,510 | 1,755 |
| 3998,000 | 291,230 | 1,757 |
| 4018,000 | 289,020 | 1,559 |
| 4039,000 | 288,810 | 1,429 |
| 4063,000 | 288,810 | 1,386 |
| 4087,000 | 288,760 | 1,360 |
| 4108,000 | 288,810 | 1,333 |
| 4131,000 | 288,370 | 1,329 |
| 4153,000 | 288,690 | 1,320 |
| 4176,000 | 288,670 | 1,305 |
| 4202,000 | 289,590 | 1,308 |
| 4224,000 | 289,440 | 1,384 |
| 4247,000 | 289,380 | 1,393 |
| 4285,000 | 289,120 | 1,390 |
| 4414,000 | 288,750 | 1,396 |
| 4542,000 | 288,660 | 1,389 |
| 4669,000 | 288,770 | 1,387 |
| 4797,000 | 288,490 | 1,383 |
| 4924,000 | 288,310 | 1,376 |
| 5053,000 | 288,160 | 1,380 |
| 5181,000 | 288,080 | 1,375 |
| 5308,000 | 287,430 | 1,377 |
| 5436,000 | 287,330 | 1,370 |
| 5563,000 | 286,700 | 1,368 |
| 5691,000 | 286,830 | 1,369 |
| 5810,000 | 286,340 | 1,384 |

DATA AS DEPICTED IN FIG.3b

| t | P50 | Va |
|---|---|---|
| 2417,000 | 295,790 | 1,224 |
| 2545,000 | 295,390 | 1,238 |
| 2672,000 | 295,340 | 1,254 |
| 2800,000 | 294,760 | 1,240 |
| 2926,000 | 294,390 | 1,241 |
| 3055,000 | 293,880 | 1,233 |
| 3183,000 | 293,450 | 1,245 |
| 3309,000 | 293,120 | 1,254 |
| 3437,000 | 292,300 | 1,233 |
| 3564,000 | 292,040 | 1,229 |
| 3692,000 | 291,390 | 1,231 |
| 3820,000 | 290,110 | 1,228 |
| 3966,000 | 288,170 | 1,224 |
| 3990,000 | 291,300 | 1,104 |
| 4013,000 | 288,710 | 1,080 |
| 4034,000 | 291,910 | 1,076 |
| 4057,000 | 289,920 | 1,056 |
| 4081,000 | 288,540 | 1,035 |
| 4102,000 | 288,190 | 1,032 |
| 4125,000 | 287,580 | 1,021 |
| 4147,000 | 287,470 | 1,024 |
| 4170,000 | 300,220 | 1,211 |
| 4193,000 | 299,370 | 1,222 |
| 4215,000 | 298,790 | 1,227 |
| 4238,000 | 298,320 | 1,228 |
| 4282,000 | 297,750 | 1,231 |
| 4411,000 | 297,520 | 1,230 |
| 4539,000 | 296,550 | 1,231 |
| 4666,000 | 296,320 | 1,252 |
| 4794,000 | 295,600 | 1,249 |
| 4920,000 | 294,250 | 1,234 |
| 5049,000 | 293,880 | 1,224 |
| 5177,000 | 294,050 | 1,237 |
| 5304,000 | 293,250 | 1,235 |
| 5432,000 | 292,820 | 1,231 |
| 5558,000 | 290,560 | 1,221 |
| 5687,000 | 289,370 | 1,234 |
| 5815,000 | 288,460 | 1,231 |

DATA AS DEPICTED IN FIG.4a

| t | P50 | Vc |
|---|---|---|
| 0,000 | | 0,041 |
| 11,000 | 169,560 | 0,614 |
| 21,000 | 342,780 | 0,785 |
| 32,000 | 300,160 | 0,821 |
| 47,000 | 295,820 | 0,809 |
| 63,000 | 295,070 | 0,847 |
| 78,000 | 296,880 | 0,853 |
| 93,000 | 297,050 | 0,911 |
| 108,000 | 301,880 | 0,880 |
| 123,000 | 301,790 | 0,919 |
| 139,000 | 302,590 | 0,895 |
| 154,000 | 303,000 | 0,911 |
| 169,000 | 306,350 | 0,915 |
| 184,000 | 311,080 | 0,913 |
| 304,000 | 310,320 | 0,898 |
| 425,000 | 310,440 | 0,900 |
| 545,000 | 309,970 | 0,879 |
| 666,000 | 309,980 | 0,867 |
| 786,000 | 309,890 | 0,891 |
| 906,000 | 309,430 | 0,885 |
| 1027,000 | 308,520 | 0,891 |
| 1147,000 | 308,460 | 0,864 |
| 1267,000 | 307,190 | 0,857 |
| 1387,000 | 307,010 | 0,853 |
| 1508,000 | 307,110 | 0,844 |
| 1609,000 | 286,740 | 0,773 |
| 1965,000 | 280,620 | 0,745 |
| 1981,000 | 263,650 | 0,701 |
| 1996,000 | 253,760 | 0,677 |
| 2011,000 | 238,670 | 0,663 |
| 2027,000 | 240,140 | 0,664 |
| 2042,000 | 242,920 | 0,632 |
| 2057,000 | 216,030 | 0,639 |
| 2072,000 | 216,210 | 0,631 |
| 2087,000 | 191,890 | 0,608 |
| 2103,000 | 201,110 | 0,621 |
| 2119,000 | 191,880 | 0,605 |
| 2134,000 | 212,610 | 0,628 |
| 2149,000 | 238,520 | 0,660 |
| 2168,000 | | |

DATA AS DEPICTED IN FIG.4b

| t | P50 | Vc |
|---|---|---|
| 0,000 | | 0,858 |
| 17,000 | 310,990 | 0,948 |
| 40,000 | 292,950 | 0,901 |
| 62,000 | 291,900 | 0,880 |
| 84,000 | 291,670 | 0,864 |
| 106,000 | 291,600 | 0,851 |
| 128,000 | 293,000 | 0,840 |
| 150,000 | 292,480 | 0,843 |
| 172,000 | 292,370 | 0,904 |
| 195,000 | 297,570 | 0,904 |
| 217,000 | 298,300 | 0,906 |
| 239,000 | 298,270 | 0,908 |
| 261,000 | 298,490 | 0,909 |
| 294,000 | 298,480 | 0,905 |
| 422,000 | 299,510 | 0,895 |
| 550,000 | 298,470 | 0,885 |
| 677,000 | 298,630 | 0,888 |
| 805,000 | 298,040 | 0,866 |
| 932,000 | 295,480 | 0,857 |
| 1059,000 | 292,040 | 0,847 |
| 1187,000 | 288,510 | 0,847 |
| 1314,000 | 286,770 | 0,835 |
| 1442,000 | 283,510 | 0,802 |
| 1568,000 | 271,710 | 0,790 |
| 1695,000 | 265,130 | 0,798 |
| 1822,000 | 266,480 | 0,776 |
| 1963,000 | 260,330 | 0,675 |
| 1986,000 | 211,250 | 0,667 |
| 2008,000 | 218,940 | 0,665 |
| 2030,000 | 223,030 | 0,667 |
| 2052,000 | 227,760 | 0,666 |
| 2075,000 | 229,400 | 0,664 |
| 2097,000 | 231,530 | 0,658 |
| 2119,000 | 229,420 | 0,642 |
| 2140,000 | 224,050 | 0,708 |
| 2163,000 | 250,750 | 0,848 |
| 2186,000 | 299,970 | 0,857 |
| 2207,000 | 299,930 | 0,854 |
| 2230,000 | 299,280 | 0,853 |
| 2257,000 | 298,950 | |

FIG.6e

DATA AS DEPICTED IN FIG.4a

| t | P50 | Vc |
|---|---|---|
| 2288,000 | 226,090 | 0,651 |
| 2409,000 | 231,740 | 0,660 |
| 2529,000 | 223,250 | 0,652 |
| 2650,000 | 216,270 | 0,650 |
| 2770,000 | 206,720 | 0,641 |
| 2890,000 | 196,930 | 0,637 |
| 3011,000 | 192,480 | 0,634 |
| 3131,000 | 180,300 | 0,628 |
| 3251,000 | 183,470 | 0,637 |
| 3371,000 | 175,990 | 0,632 |
| 3492,000 | 168,920 | 0,625 |
| 3613,000 | 160,600 | 0,613 |
| 3987,000 | 164,140 | 0,615 |
| 4003,000 | 137,270 | 0,480 |
| 4018,000 | 132,040 | 0,411 |
| 4033,000 | 129,500 | 0,377 |
| 4044,000 | 130,400 | 0,370 |
| 4055,000 | 129,020 | 0,360 |
| 4066,000 | 129,020 | 0,353 |
| 4077,000 | 128,770 | 0,347 |
| 4087,000 | 128,310 | 0,341 |
| 4098,000 | 126,570 | 0,332 |
| 4109,000 | 126,980 | 0,330 |
| 4120,000 | 127,950 | 0,331 |
| 4131,000 | 127,790 | 0,330 |
| 4172,000 | 126,230 | 0,316 |
| 4288,000 | 180,190 | 0,529 |
| 4409,000 | 177,980 | 0,530 |
| 4529,000 | 173,050 | 0,520 |
| 4649,000 | 166,880 | 0,502 |
| 4769,000 | 168,230 | 0,504 |
| 4890,000 | 162,960 | 0,494 |
| 5010,000 | 162,160 | 0,490 |
| 5130,000 | 160,540 | 0,482 |
| 5251,000 | 159,030 | 0,485 |
| 5371,000 | 153,790 | 0,467 |
| 5492,000 | 152,920 | 0,470 |
| 5612,000 | 151,660 | 0,469 |

DATA AS DEPICTED IN FIG.4b

| t | P50 | Vc |
|---|---|---|
| 2513,000 | 297,930 | 0,849 |
| 2640,000 | 292,010 | 0,827 |
| 2768,000 | 287,310 | 0,816 |
| 2894,000 | 283,990 | 0,811 |
| 3022,000 | 284,080 | 0,808 |
| 3150,000 | 276,710 | 0,791 |
| 3277,000 | 275,310 | 0,786 |
| 3405,000 | 261,370 | 0,756 |
| 3532,000 | 260,620 | 0,757 |
| 3659,000 | 260,040 | 0,752 |
| 3787,000 | | |
| 3941,000 | 252,200 | 0,743 |
| 3964,000 | 193,740 | 0,612 |
| 3987,000 | 185,380 | 0,531 |
| 4008,000 | 188,320 | 0,525 |
| 4031,000 | 196,450 | 0,533 |
| 4053,000 | 197,130 | 0,528 |
| 4075,000 | 198,110 | 0,522 |
| 4092,000 | 199,040 | 0,524 |
| 4109,000 | 199,630 | 0,521 |
| 4126,000 | 201,000 | 0,520 |
| 4143,000 | 221,400 | 0,609 |
| 4165,000 | 302,280 | 0,840 |
| 4187,000 | 302,350 | 0,841 |
| 4216,000 | 300,960 | 0,844 |
| 4344,000 | 299,890 | 0,850 |
| 4472,000 | 297,980 | 0,844 |
| 4599,000 | 296,770 | 0,841 |
| 4727,000 | 293,020 | 0,837 |
| 4854,000 | 287,650 | 0,828 |
| 4981,000 | 283,150 | 0,812 |
| 5109,000 | 281,430 | 0,805 |
| 5236,000 | 279,280 | 0,802 |
| 5364,000 | 276,850 | 0,804 |
| 5491,000 | 275,020 | 0,799 |
| 5619,000 | 269,360 | 0,778 |
| 5747,000 | 268,030 | 0,775 |

DATA AS DEPICTED IN FIG.5a

| t | P50 | Vc |
|---|---|---|
| 0,000 | | 0,336 |
| 18,000 | 302,370 | 1,009 |
| 35,000 | 299,790 | 1,154 |
| 56,000 | 305,760 | 1,182 |
| 77,000 | 309,170 | 1,195 |
| 99,000 | 310,180 | 1,197 |
| 120,000 | 309,590 | 1,186 |
| 141,000 | 310,180 | 1,187 |
| 162,000 | 309,320 | 1,165 |
| 184,000 | 309,520 | 1,091 |
| 205,000 | 309,960 | 1,122 |
| 227,000 | 309,660 | 1,106 |
| 248,000 | 308,870 | 1,072 |
| 291,000 | 308,970 | 1,072 |
| 418,000 | 308,800 | 1,047 |
| 544,000 | 308,710 | 1,049 |
| 670,000 | 308,310 | 1,035 |
| 797,000 | 308,300 | 1,036 |
| 923,000 | 308,200 | 1,025 |
| 1049,000 | 308,220 | 1,028 |
| 1176,000 | 307,950 | 1,022 |
| 1303,000 | 307,770 | 1,008 |
| 1429,000 | 307,880 | 1,019 |
| 1555,000 | 308,370 | 1,004 |
| 1681,000 | 308,650 | 1,002 |
| 1808,000 | 308,430 | 1,002 |
| 1981,000 | 308,310 | 0,973 |
| 2003,000 | 308,390 | 0,957 |
| 2025,000 | 308,220 | 0,943 |
| 2046,000 | 307,590 | 0,941 |
| 2067,000 | 308,060 | 0,930 |
| 2089,000 | 307,730 | 0,927 |
| 2110,000 | 307,430 | 0,920 |
| 2132,000 | 307,030 | 0,915 |
| 2153,000 | 306,850 | 0,932 |
| 2175,000 | 306,940 | 0,945 |
| 2196,000 | 307,220 | 0,928 |
| 2219,000 | 307,520 | 0,941 |
| 2241,000 | 307,510 | 0,941 |
| 2267,000 | 307,440 | 0,941 |

DATA AS DEPICTED IN FIG.5b

| t | P50 | Vc |
|---|---|---|
| 0,000 | | 0,011 |
| 11,000 | 121,000 | 0,786 |
| 23,000 | 293,950 | 0,810 |
| 37,000 | 294,510 | 0,792 |
| 53,000 | 294,110 | 0,808 |
| 69,000 | 293,850 | 0,821 |
| 83,000 | 294,000 | 0,804 |
| 99,000 | 292,050 | 0,804 |
| 114,000 | 292,140 | 0,798 |
| 129,000 | 292,180 | 0,764 |
| 145,000 | 291,610 | 0,777 |
| 160,000 | 291,790 | 0,781 |
| 176,000 | 291,720 | 0,844 |
| 209,000 | 300,230 | 0,849 |
| 330,000 | 300,860 | 0,842 |
| 451,000 | 300,740 | 0,830 |
| 571,000 | 300,800 | 0,829 |
| 691,000 | 300,600 | 0,828 |
| 812,000 | 300,910 | 0,838 |
| 932,000 | 300,690 | 0,839 |
| 1053,000 | 300,810 | 0,818 |
| 1173,000 | 300,540 | 0,822 |
| 1293,000 | 300,470 | 0,824 |
| 1413,000 | 300,570 | 0,821 |
| 1534,000 | 300,640 | 0,814 |
| 1655,000 | 300,590 | 0,760 |
| 1976,000 | 300,140 | 0,712 |
| 1992,000 | 291,760 | 0,688 |
| 2007,000 | 288,720 | 0,677 |
| 2022,000 | 288,440 | 0,658 |
| 2038,000 | 288,150 | 0,630 |
| 2054,000 | 286,410 | 0,618 |
| 2069,000 | 285,530 | 0,604 |
| 2080,000 | 286,900 | 0,577 |
| 2090,000 | 283,560 | 0,553 |
| 2101,000 | 278,480 | 0,530 |
| 2113,000 | 277,930 | 0,537 |
| 2123,000 | 271,140 | 0,477 |
| 2134,000 | 282,200 | |
| 2157,000 | 263,130 | |

FIG.6h

DATA AS DEPICTED IN FIG.5a

| t | P50 | Vc |
|---|---|---|
| 2393,000 | 307,610 | 0,927 |
| 2520,000 | 307,650 | 0,927 |
| 2646,000 | 307,510 | 0,935 |
| 2773,000 | 307,640 | 0,927 |
| 2899,000 | 307,730 | 0,924 |
| 3026,000 | 307,660 | 0,922 |
| 3153,000 | 307,520 | 0,922 |
| 3279,000 | 307,550 | 0,910 |
| 3405,000 | 307,720 | 0,909 |
| 3531,000 | 307,660 | 0,910 |
| 3658,000 | 307,640 | 0,907 |
| 3785,000 | 307,580 | 0,930 |
| 3953,000 | 307,630 | 0,927 |
| 3974,000 | 305,500 | 0,892 |
| 3996,000 | 293,730 | 0,824 |
| 4017,000 | 291,070 | 0,791 |
| 4039,000 | 291,460 | 0,766 |
| 4061,000 | 292,200 | 0,734 |
| 4081,000 | 293,570 | 0,715 |
| 4103,000 | 293,340 | 0,689 |
| 4124,000 | 294,680 | 0,668 |
| 4145,000 | 295,440 | 0,680 |
| 4167,000 | 291,910 | 0,775 |
| 4188,000 | 292,030 | 0,792 |
| 4210,000 | 292,020 | 0,795 |
| 4236,000 | 293,990 | 0,797 |
| 4363,000 | 294,570 | 0,791 |
| 4489,000 | 294,830 | 0,785 |
| 4615,000 | 296,690 | 0,783 |
| 4742,000 | 297,200 | 0,775 |
| 4868,000 | 297,000 | 0,770 |
| 4995,000 | 297,400 | 0,768 |
| 5122,000 | 297,370 | 0,766 |
| 5248,000 | 296,940 | 0,755 |
| 5374,000 | 297,480 | 0,760 |
| 5500,000 | 298,370 | 0,746 |
| 5627,000 | 298,160 | 0,750 |
| 5753,000 | 298,690 | 0,752 |

DATA AS DEPICTED IN FIG.5b

| t | P50 | Vc |
|---|---|---|
| 2274,000 | 294,550 | 0,769 |
| 2394,000 | 296,380 | 0,776 |
| 2514,000 | 295,400 | 0,787 |
| 2635,000 | 295,890 | 0,785 |
| 2755,000 | 296,130 | 0,758 |
| 2876,000 | 295,820 | 0,763 |
| 2997,000 | 295,830 | 0,759 |
| 3117,000 | 296,880 | 0,753 |
| 3237,000 | 295,190 | 0,756 |
| 3357,000 | 294,890 | 0,767 |
| 3478,000 | 293,930 | 0,761 |
| 3599,000 | 293,940 | 0,738 |
| 3957,000 | 293,770 | 0,733 |
| 3973,000 | 251,690 | 0,757 |
| 3985,000 | 229,950 | 0,329 |
| 3995,000 | 219,310 | 0,288 |
| 4006,000 | 202,440 | 0,246 |
| 4018,000 | 198,220 | 0,229 |
| 4028,000 | 189,260 | 0,208 |
| 4039,000 | 178,000 | 0,184 |
| 4050,000 | 170,400 | 0,167 |
| 4061,000 | 162,800 | 0,150 |
| 4073,000 | 149,700 | 0,131 |
| 4084,000 | 149,340 | 0,125 |
| 4095,000 | 138,080 | 0,111 |
| 4122,000 | 129,350 | 0,085 |
| 4238,000 | 297,260 | 0,589 |
| 4355,000 | 290,010 | 0,605 |
| 4471,000 | 291,560 | 0,615 |
| 4587,000 | 280,110 | 0,578 |
| 4702,000 | 282,710 | 0,590 |
| 4819,000 | 279,690 | 0,585 |
| 4935,000 | 279,540 | 0,578 |
| 5051,000 | 278,680 | 0,588 |
| 5167,000 | 277,800 | 0,583 |
| 5282,000 | 274,500 | 0,575 |
| 5399,000 | 276,730 | 0,584 |
| 5515,000 | 265,540 | 0,577 |

COAGULATION/FLOCCULATION TECHNIQUE

BACKGROUND OF THE INVENTION

1. Field of the Invention

The present invention relates to a novel technique for effecting coagulation/flocculation of aggregate-forming suspensions, and, more especially, to improved coagulation/flocculation technique characterized by enhanced cohesion among the individual flocs emanating from an aggregate suspension.

2. Description of the Prior Art

Coagulation/flocculation processes are widely employed in numerous fields of industry where there is a need to separate media comprising phases requiring separation, notably slurries. These processes are characterized by two principal steps or stages. The first step is actual flocculation, entailing aggregation of colloidal suspensions by, firstly, neutralizing the effect of the double layer of electrical charges (between the electrically-charged surface and a compensatory charge distributed throughout the mass of the solution) and, secondly, adding a flocculating or coagulating agent thereto. Such agent, which is typically an electrolyte or a polymer, such as polyacrylamide or polyaluminum chloride, initiates the formation of bridges that promote coalescence, i.e., flocculation. The particles thus obtained are then subjected to coagulation, via collisions between and among said particles. Generally, a collision is generated by motion of a mechanical origin, this being referred to as orthokinetic coagulation.

The solution containing the flocs thus obtained is then filtered, generally by filtration on a support or carrier. During this operation, numerous problems can arise, two of which predominate. The first of these is due to an absence of cohesion of the flocs which, as a result of attrition, disintegrate or break up into so-called microflocs, or fines, during their passage or transfer through valves, pumps, etc., and, as such, are able to destroy the equilibrium of the filter cake, be transferred into the filtrate, etc. The second problem is the presence of coagulant in the filtrate, this frequently being the result of using an excess of coagulant intended to overcome the difficulty indicated above.

"The behaviour of aggregates in stirred vessels," *Trans. I. Chem.*, vol. 56, pp 9–18, Tomi and Bagster (1978), describes the relation between the size of the flocs and a cycle consisting of fast or rapid stirring at 500 rpm and slow stirring at 250 rpm, thereby effecting a distinct reduction in floc size as a function of the duration of stirring. "The role of rapid mixing time on a flocculation process," *Wat. Sci. Tech.*, vol. 17, Amsterdam, pp 1091–1101 (Francois and van Haute) indicates that rapid stirring is necessary in the initial stage of coagulation, in order to obtain flocs having a high degree of cohesion. Such rapid stirring, with shear stresses (velocity gradient) of about 330 $s^{-1}$ should nevertheless be carried out over a period of less than 150 seconds in order not to adversely affect floc growth and stability, and should satisfy several secondary criteria. Rapid stirring for a period of 30 seconds is described as being the optimum.

SUMMARY OF THE INVENTION

Accordingly, a major object of the present invention is the provision of an improved coagulation/flocculation technique that avoids or conspicuously ameliorates the above disadvantages and drawbacks to date characterizing the state of this art.

Briefly, the present invention features improved technique for the coagulation/flocculation of a suspension having aggregate-forming properties and containing an effective amount of a coagulant, comprising, at least in the initial stage thereof, a beginning operating cycle including:

(i) a rapid agitation step at an average velocity gradient ranging from 300 to 1,000 $s^{-1}$ for a duration or period of time ranging from 30 to 200 seconds, and (ii) a slow or mild agitation step with an average velocity gradient ranging from 40 to 100 $s^{-1}$, for a period of time ranging from 5 to 40 minutes.

BRIEF DESCRIPTION OF THE DRAWINGS

FIG. 6 is a Table II reporting the actual values used to plot the several graphs shown in FIGS. 2a to 5a and FIGS. 2b to 5b, respectively.

DETAILED DESCRIPTION OF PREFERRED EMBODIMENTS OF THE INVENTION

More particularly according to the present invention, the average velocity gradient of the rapid agitation step is preferably about 450 $s^{-1}$, and the average velocity gradient of the slow or mild agitation step is preferably about 85 $s^{-1}$.

The duration of the rapid agitation step preferably ranges from 120 to 200 seconds and, advantageously, is about 180 sec. The duration of the slow or mild agitation step is preferably about 30 min.

Any conventional coagulant may be employed. However, the coagulant is preferably selected from among $FeCl_3$, polyaluminum chloride (PAC), $Al_2(SO_4)_3$, and mixtures thereof.

The pH of the suspension advantageously ranges from 5 to 9 and preferably from 5.5 to 8.5.

In one preferred embodiment of the invention, apart from the initial operating cycle in the initial stage of said process, the technique includes at least one additional operating cycle, and preferably includes two additional operating cycles. This or these additional cycle(s) also comprise rapid and slow agitation or stirring steps. Preferably, the average velocity gradient of the rapid agitation step is increased from one cycle to the subsequent cycle. Advantageously, the average velocity gradient of the rapid agitation step is increased by at least about 225 $s^{-1}$ from one cycle to the next cycle. The average velocity gradient of the slow agitation step remains substantially constant during the various cycles.

In another embodiment of the invention, the duration of the rapid agitation step remains substantially constant from one cycle to the next cycle. Similarly, the duration of the slow agitation step remains substantially constant from one cycle to the next.

In a particularly preferred embodiment of the invention, the subject process/technique comprises the following three cycles (a), (b) and (c):

(a)(i) a rapid agitation step at an average velocity gradient of about 450 s$^{-1}$ for a duration of about 180 sec; and (ii) a slow agitation step at an average velocity gradient of about 85 s$^{-1}$ for a duration of about 30 min;

(b)(i) a rapid agitation step at an average velocity gradient of about 725 s$^{-1}$ for a duration of about 180 sec; and (ii) a slow agitation step at an average velocity gradient of about 85 s$^{-1}$ for a duration of about 30 min; and (c)(i) a rapid agitation step at an average velocity gradient of about 1000 s$^{-1}$ for a duration of about 180 sec; and (ii) a slow agitation step at an average velocity gradient of about 85 s$^{-1}$ for a duration of about 30 min.

Any apparatus conventionally employed in coagulation/flocculation processes can be used to carry out the present invention. Exemplary such apparatus includes helical, blade, band, anchor, rotor/stator or impeller stirrers or agitators, provided either with or without baffles or static means.

Figure 1:
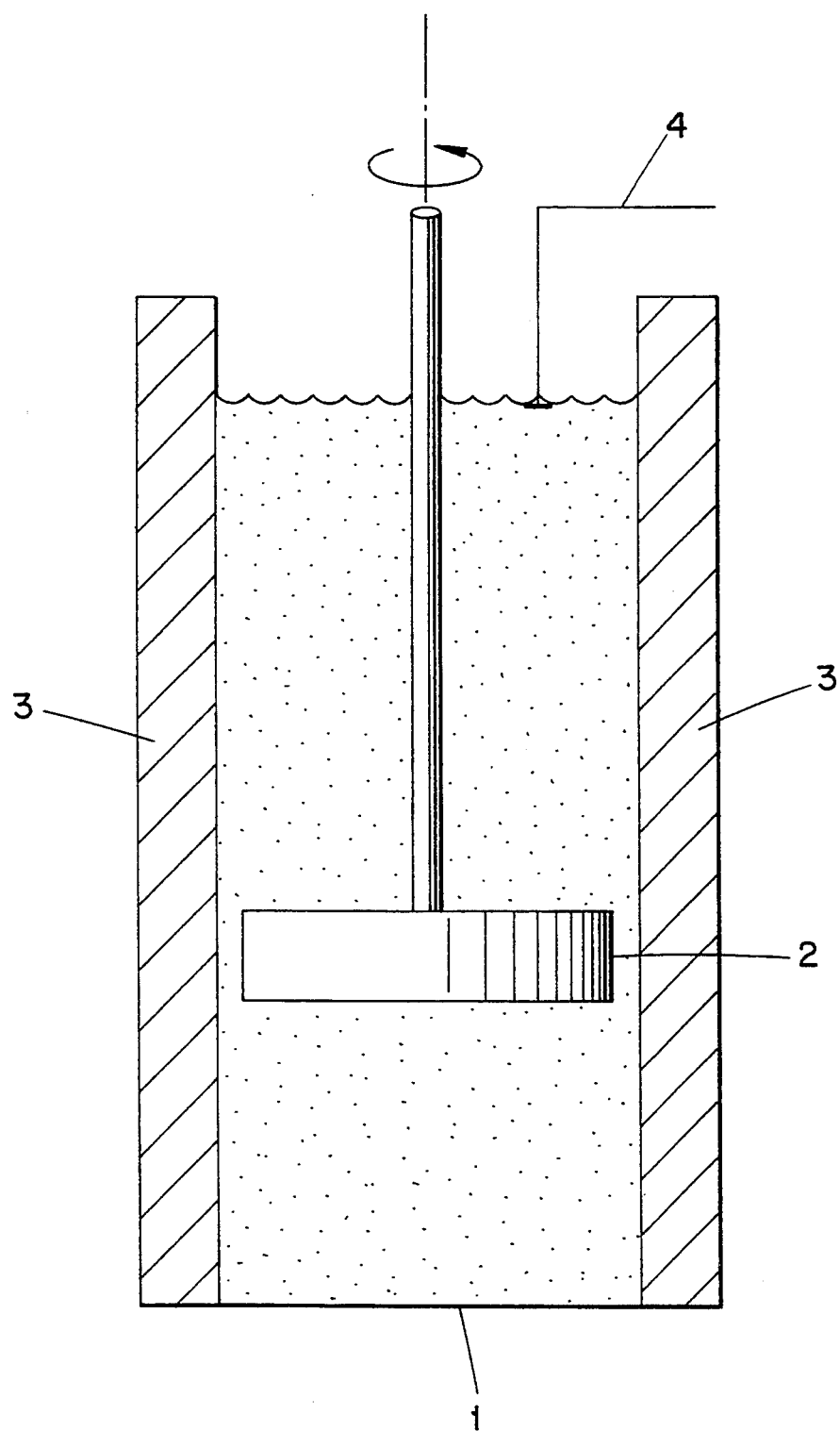
FIG. 1 is a partial cross-sectional view, in elevation, of suitable stirring apparatus for carrying out the process of the present invention.

The apparatus employed for agitation is shown diagrammatically and in cross-section in FIG. 1. The stirring apparatus is of the rotating paddle blade-and-baffle type, the characteristics of which are as follows, again with reference to FIG. 1:

Stirring apparatus 1 comprises a cylindrical vessel of inside diameter 90 mm and a height of 165 mm. The height of the liquid in the stirring apparatus is 150 mm. Said stirring apparatus 1 is equipped with a stirring blade 2 having a diameter of 60 mm, a height of 15 mm; it is mounted on a 5 mm diameter shaft. The axis of the blade coincides with the axis of the cylindrical stirring apparatus. The stirring blade 2 is arranged such that the lower end of the blade is situated at 50 mm from the bottom or base of stirring apparatus 1. The stirring apparatus 1 is, moreover, equipped with four baffles 3 arranged uniformly therewithin; the baffles 3 are 12.5 mm wide. Supernatant liquid is drawn off by means of a dip tube 4 arranged to be 15 mm below the top of stirring device 1. The geometry of this stirring apparatus enables the average velocity gradient to be determined as a function of the speed of rotation, in rpm, of the stirring blade.

The aggregate suspension employed was a synthetic suspension comprising an aqueous suspension at a temperature of about 20° C., prepared from 500 ppm silica (Ludox HS 40 silica) and a NaHCO$_3$/NaCl electrolyte at a respective concentration of 336 ppm/70 ppm.

Coagulation/flocculation was carried out using a dosage amount of coagulant defined by a conventional jar test, connoting the best clarification obtained for the smallest possible dose of coagulant.

With specific regard to the stirring, two sets of conditions or test procedures were employed, and for each of these the full cycle was applied to the same suspension. Test procedure I corresponds to a comparative control, whereas test procedure II employs the set of conditions according to the present invention.

These two test procedures are defined in TABLE I below. The coagulant was added at time t=0.

TABLE I

| TEST PROCEDURE I | | | TEST PROCEDURE II | | |
|---|---|---|---|---|---|
| Intensity of stirring (rpm) | Average velocity gradient (s$^{-1}$) | Stirring time (min) | Intensity of stirring (rpm) | Average velocity gradient (s$^{-1}$) | Stirring time (min) |
| 60 | 85 | 3 | 250 | 450 | 3 |
| 60 | 85 | 30 | 60 | 85 | 30 |
| 120 | 190 | 3 | 350 | 725 | 3 |
| 60 | 85 | 30 | 60 | 85 | 30 |
| 250 | 450 | 3 | 450 | 1000 | 3 |
| 60 | 85 | 30 | 60 | 85 | 30 |

During the various stirring steps, the average size of the flocs was analysed and recorded. This measurement was carried out by light diffraction using a Malvern Master Sizer, the dimensional measurement range for which extending from 0.1 to 600 μm.

TABLE II (FIG. 6) reports the values actually obtained, these being plotted in FIGS. 2a to 5a (control) and in FIGS. 2b to 5b (according to the invention). In Table II, t represents the stirring time expressed in seconds, P50 is the average floc diameter expressed in μm and Vc is the floc volume concentration expressed as a percentage of the volume illuminated by the light beam.

In order to further illustrate the present invention and the advantages thereof, the following specific examples are given, it being understood that same are intended only as illustrative and in nowise limitative.

EXAMPLE 1

The coagulant was FeCl$_3$, at a concentration of 1.28·10$^{-4}$ mol.l$^{-1}$. The pH of the suspension was 5.5.

Figure 2A:
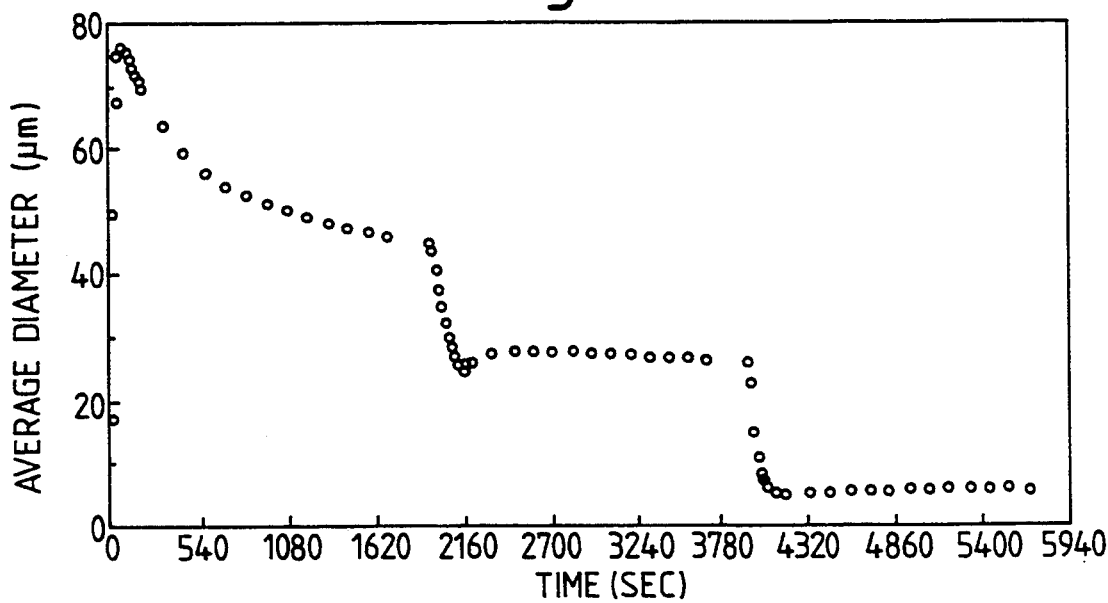
FIGS. 2 to 5 are graphs plotting average floc size as a function of duration of stirring/agitation for two processes, one according to the prior art (FIGS. 2a to 5a) and the other according to the present invention (FIGS. 2b to 5b), for various aggregate suspensions.
Figure 2B:
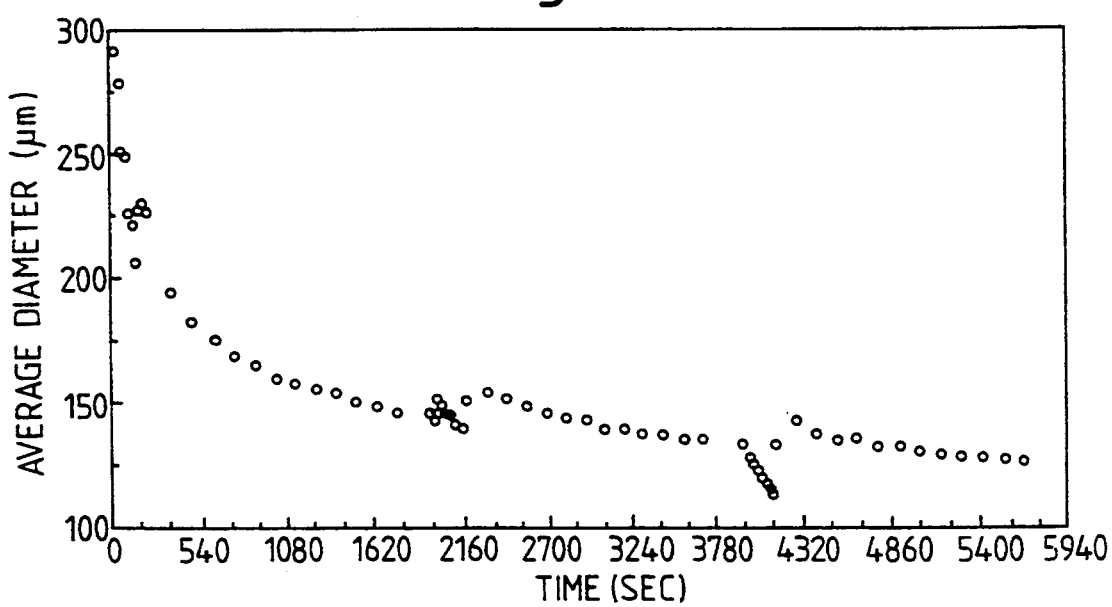

The results obtained are plotted and shown in FIG. 2. The two test procedures described above were carried out, and FIGS. 2a and 2b respectively correspond to test procedures I and II.

Two behaviors can be clearly distinguished as a function of the test procedure selected. Set I, corresponding to three stirring cycles at 60/60, 120/60 and 250/60 rpm results in slow and regular deterioration of floc size during the first 60/60 rpm phase; this deterioration continued during the aggregate disintegration phases at 120 and 250 rpm via a rapid and irreversible decrease in the average diameter of the particles, the value of which stabilized at a value of around 10 μm (see FIG. 2a) upon return to slow stirring at 60 rpm.

The first part of the curve for test procedure II according to the invention, with stirring cycles at 250/60, 350/60 and 450/60 rpm, also exhibited, subsequent to the formation of flocs, a rapid decrease in average floc dimensions to a value of about 150 μm (see FIG. 2b). But, in contradistinction to test procedure I, the floc disintegration or ruptures produced by the 350 and 450 rpm stirring steps are now reversible, and the changeover to the slow stirring step resulted in a return to an equilibrium size of around 150 μm.

Thus, ferric chloride FeCl$_3$ at a pH 5.5 produced flocs which were not only stronger, but also larger, when the initial rapid stirring stage was carried out with stirring at 250 rpm. The subsequent break-up that the flocs underwent had little or no effect on their average dimensions, and did not result in the production of fines.

The results obtained for floc volume concentration as a function of stirring time reported in Table II indicate exactly the same phenomenon; the various phases of disintegration did not modify the total floc volume.

EXAMPLE 2

The coagulant was FeCl$_3$, at a concentration of $8.45 \cdot 10^{-4}$ mol.l$^{-1}$. The pH of the suspension was 7.0.

Figure 3A:
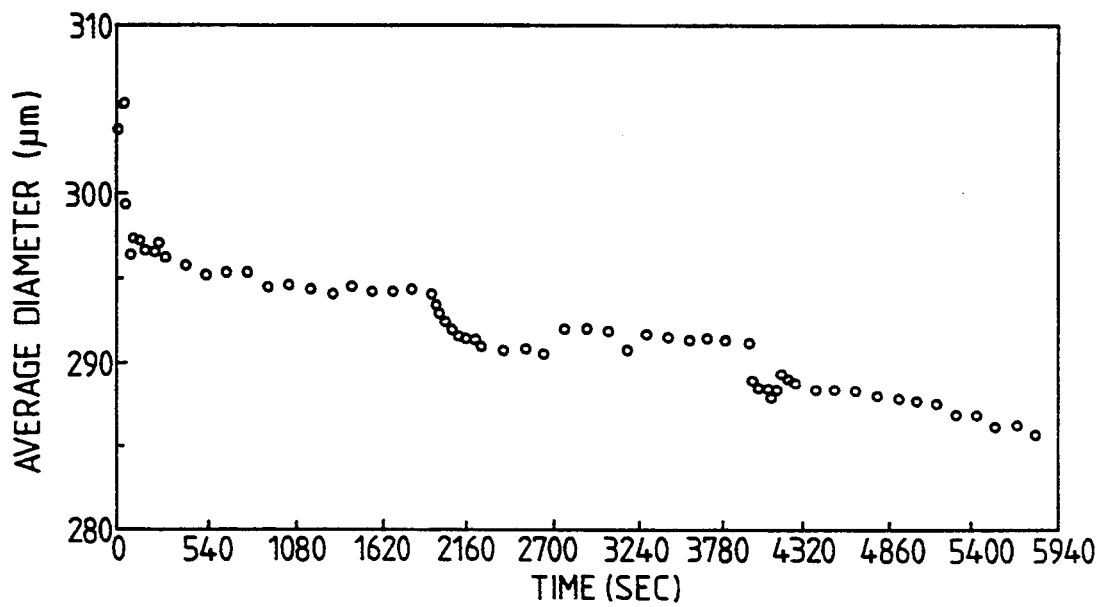
Figure 3B:
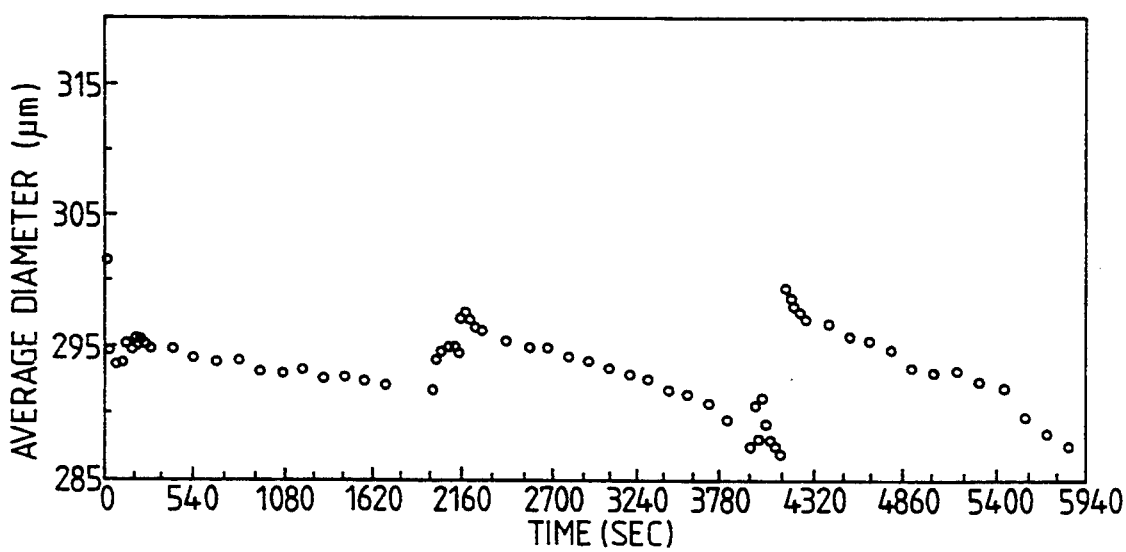

The actual measurements are reported in Table II below, which indicates the average diameter and total floc volume concentration as a function of the duration of stirring. The graphs indicating average floc diameter as a function of stirring time are shown in FIG. 3. The two test procedures were carried out, FIGS. 3a and 3b respectively corresponding to test procedures I and II.

The overall behavior of the ferric chloride in respect of stirring, at a pH 7.0, was similar to that at pH 5.5. An increase in mixing intensity during stirring resulted in irreversible deterioration of the floc when test procedure I was employed; in contradistinction thereto, the average floc dimensions were restored following initiation of disintegration conditions (commencing of rapid stirring step) when test procedure II was employed.

EXAMPLE 3

The coagulant was WAC HB at a concentration of $4.4 \cdot 10^{-4}$ mol.l$^{-1}$. The pH of the suspension was 8.0.

Figure 4A:
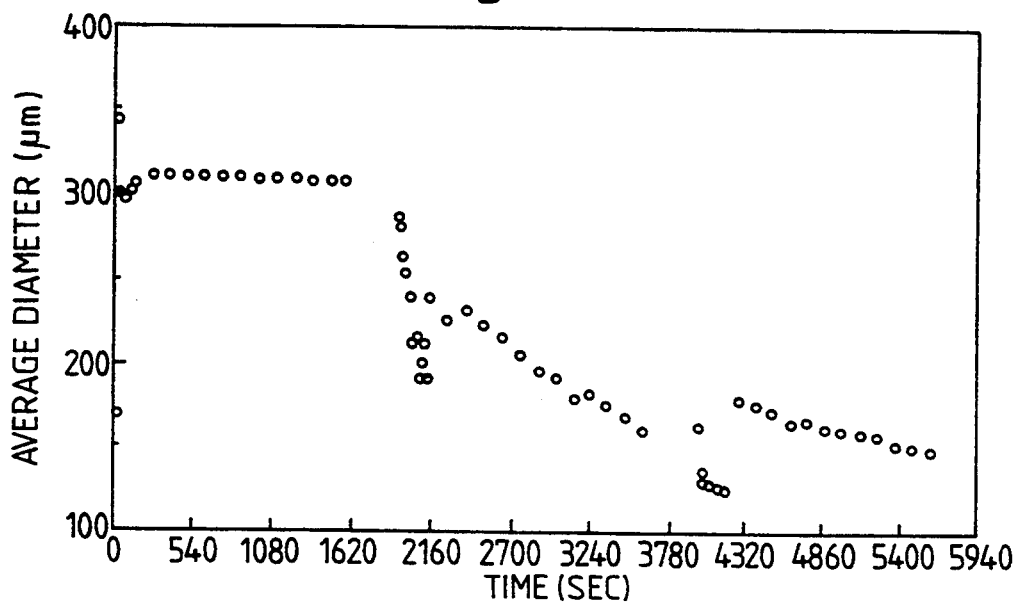
Figure 4B:
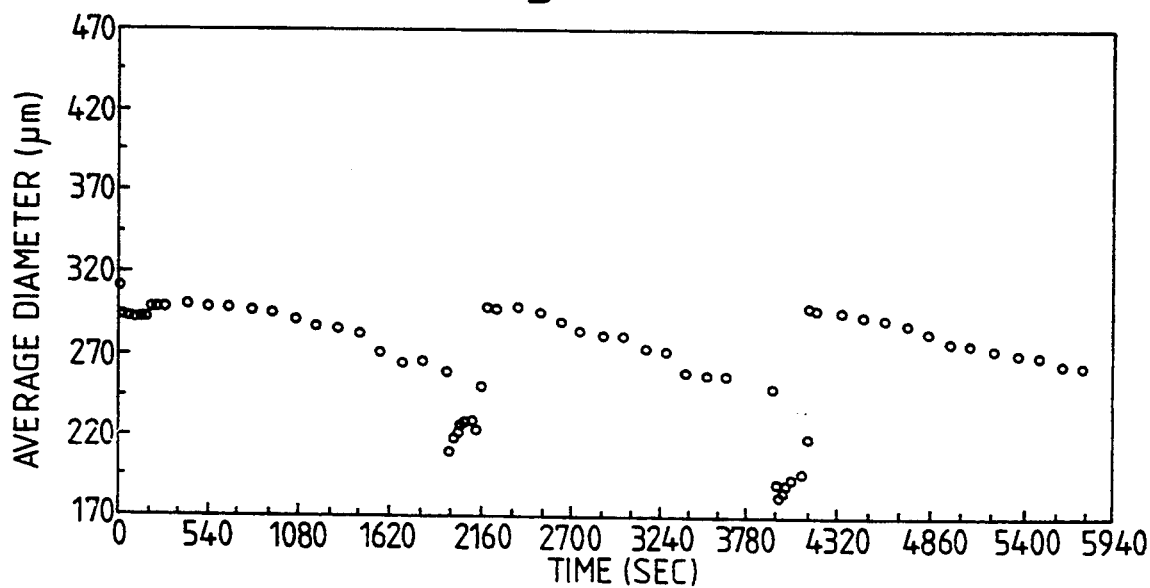

The measurement results are reported in graphical form in FIG. 4, indicating the average floc diameter as a function of duration of stirring. These graphs are shown in FIGS. 4a and 4b respectively corresponding to test procedures I and II.

The actual data used to provide these graphs, set forth in Table II, also reflect the values obtained for floc volume concentration as a function of stirring time.

The WAC HB was polyaluminum chloride corresponding to the formula for basic aluminum chlorosulfate:

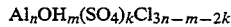

$$Al_nOH_m(SO_4)_kCl_{3n-m-2k}$$

in which basicity or molar ratio (m/3n)×100 ranges from about 40% to about 65%. The product has an Al equivalent/Cl equivalent ratio ranging from 2.8 to 5, an apparent molecular weight MA measured by conventional light diffusion, and apparent hydrodynamic diameters OZ and OW, measured by quasi-elastic diffusion of light, of the following respective values:

MA = 7,000–35,000
OZ(Å) = 350–2,500
OW(Å) = 200–1,200

This product is described in FR-A-2,584,699.

The behavior of WAC HB was similar to the behavior of FeCl$_3$. The average floc size changed from 300 to 150 μm in the case of test procedure I, and from 300 to 270 μm in the case of test procedure II; the plots of average diameters bear witness to aggregate break-up which was irreversible in the case of test procedure I, but reversible in the case of test procedure II.

EXAMPLE 4

The coagulant was aluminum sulfate Al$_2$(SO$_4$)$_3$ at a concentration of $8.24 \cdot 10^{-4}$ mol.l$^{-1}$; the pH of the suspension was 8.0.

Figure 5A:
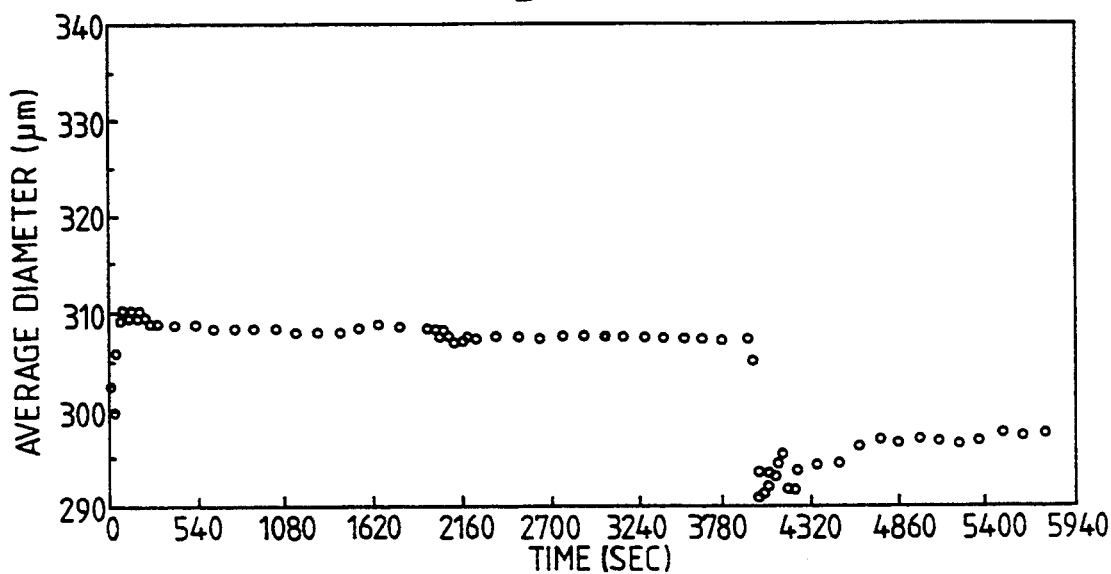
Figure 5B:
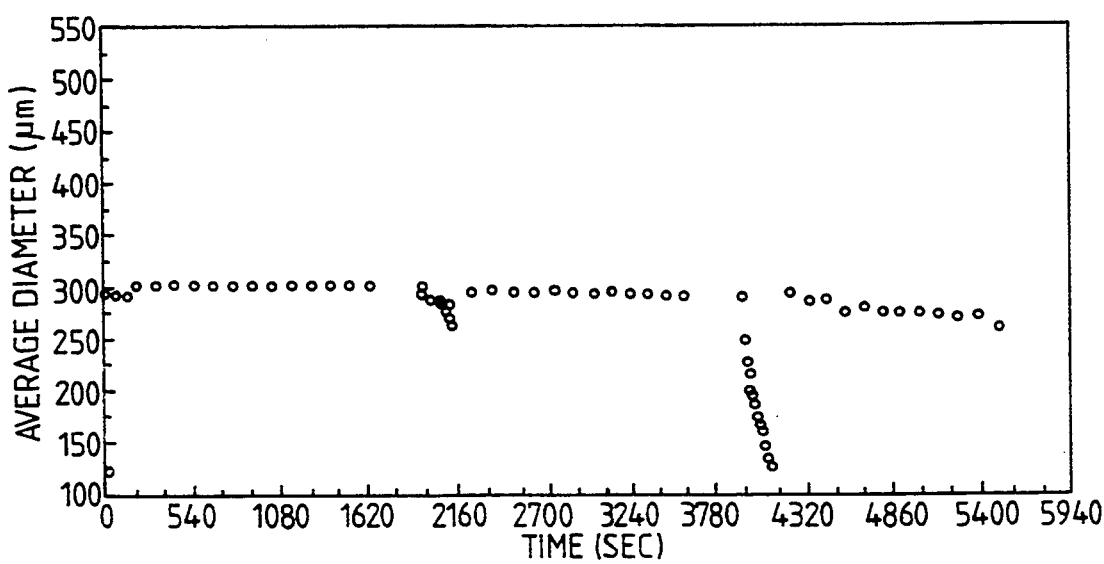

The results of the measurements are reported in Table II, which indicates the average diameter of the flocs and the total floc volume as a function of duration of stirring. The corresponding graphs for average floc diameter are shown in FIG. 5, with FIGS. 5a and 5b providing a comparison between the test procedures I and II.

The behavior of the Al$_2$(SO$_4$)$_3$ was similar to that of the aforesaid coagulants. The average size of the flocs effectively changed from 310 to 295 μm in the case of test procedure I, whereas the average floc size remained above 305 μm in the case of test procedure II. Similarly to the examples above, the plots shown in FIG. 5 reflect the irreversible nature of aggregate break-up when test procedure I was employed, compared to the reversible nature of aggregate break-up when test procedure II was carried out.

Thus, the present invention provides a coagulation/flocculation process comprising rapid stirring during the initial phase of coagulation, producing flocs of greater size and of higher mechanical strength. There was no irreversible formation of microflocs after the flocs had been transported through pumps, restrictions in pipes and during the formation of filter cake.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. In a process for a coagulation/flocculation by agitation of an aggregate-forming suspension having a pH ranging from 5 to 9 containing a coagulant therefor comprising FeCl$_3$, polyaluminum chloride (PAC), Al$_2$(SO$_4$)$_3$ or mixture thereof, the improvement which comprises, as an agitation regime in at least an initial stage thereof, an initial operating agitation cycle (a) comprising (i) a rapid agitation sequence at an average velocity gradient ranging from 300 to 1,000 s$^{-1}$ for a period of time ranging from 30 to 200 seconds, and (ii) a slow agitation sequence at an average velocity gradient ranging from 40 to 100 s$^{-1}$ for a period of time ranging from 5 to 40 minutes and at least one additional subsequent rapid/slow agitation cycle (b) wherein the average velocity gradient of the rapid agitation step (i) in the subsequent cycle is greater than in its predecessor, the duration of the rapid agitation steps in said initial and said subsequent cycles remains substantially constant and wherein the average velocity gradient of the slow agitation step (ii) in said initial and said subsequent cycles remains substantially constant, the duration of the slow agitation steps in said initial and said subsequent cycles remains substantially constant.

2. The coagulation/flocculation process as defined by claim 1, wherein the average velocity gradient of said rapid agitation step (i) is about 450 s$^{-1}$.

3. The coagulation/flocculation process as defined by claim 1, wherein the duration of said rapid agitation step (i) is about 180 sec.

4. The coagulation/flocculation process as defined by claim 1, wherein the average velocity gradient of said slow agitation step (ii) is about 85 s$^{-1}$.

5. The coagulation/flocculation process as defined by claim 1, wherein the duration of said slow agitation step (ii) is about 30 min.

6. The coagulation/flocculation process as defined by claim 1, said aggregate-forming suspension having a pH ranging from 5.5 to 8.5.

7. The coagulation/flocculation process as defined by claim 1, said rapid agitation step in said subsequent cycle being at least 225 s$^{-1}$ greater than its predecessor.

8. The coagulation/flocculation process as defined by claim 1, further comprising at least one additional rapid/slow agitation cycles.

9. The coagulation/flocculation process as defined by claim 8, each succeeding rapid agitation step being greater than its predecessor.

10. The coagulation/flocculation process as defined by claim 9, each succeeding rapid agitation step being at least 225 $s^{-1}$ greater than its predecessor.

11. The coagulation/flocculation process as defined by claim 8, wherein the average velocity gradient of each slow agitation step in said initial cycle and said additional cycles remains substantially constant.

12. The coagulation/flocculation process as defined by claim 8, wherein the duration of each rapid agitation step in said initial cycle and said additional cycles remains substantially constant.

13. The coagulation/flocculation process as defined by claim 8, wherein the duration of each slow agitation step in said initial cycle and said additional cycles remains substantially constant.

14. The coagulation/flocculation process as defined by claim 1, comprising:
(a)(i) a rapid agitation sequence at an average velocity gradient of about 450 $s^{-1}$ for a duration of about 180 sec, and (ii) a slow agitation sequence at an average velocity gradient of about 85 $s^{-1}$ for a duration of about 30 min; (b)(i) a rapid agitation sequence at an average velocity gradient of about 725 $s^{-1}$ for a duration of about 180 sec, and (ii) a slow agitation sequence at an average velocity gradient of about 85 $s^{-1}$ for a duration of about 30 min; and (c)(i) a rapid agitation sequence at an average velocity gradient of about 1,000 $s^{-1}$ for a duration of about 180 sec; and (ii) a slow agitation sequence at an average velocity gradient of about 85 $s^{-1}$ for a duration of about 30 min.

15. The coagulation/flocculation process as defined by claim 1, said agitation comprising stirring.

* * * * *